United States Patent [19]

Yajima

[11] Patent Number: 4,911,942
[45] Date of Patent: Mar. 27, 1990

[54] STABILIZED OIL AND FAT POWDER
[75] Inventor: Mizuo Yajima, Tokyo, Japan
[73] Assignee: Asama Chemical Co., Ltd., Tokyo, Japan
[21] Appl. No.: 297,831
[22] Filed: Jan. 13, 1989
[51] Int. Cl.⁴ .................... A23D 5/00; A23/ 1/12
[52] U.S. Cl. ............................ 426/455; 426/98; 426/601; 426/609; 426/656
[58] Field of Search ............ 426/455, 609, 601, 656, 426/98

[56] References Cited

U.S. PATENT DOCUMENTS

| | | | |
|---|---|---|---|
| 3,351,531 | 11/1967 | Noznick et al. | 426/98 |
| 3,362,829 | 1/1988 | Lanfried et al. | 426/307 |
| 3,594,176 | 7/1971 | Morris | 426/609 |
| 3,880,824 | 4/1975 | Rao et al. | 426/656 |
| 4,200,569 | 4/1980 | Ladbrook et al. | 426/656 |
| 4,404,228 | 9/1983 | Cloosterman et al. | 426/98 |
| 4,645,831 | 2/1987 | Lawhorn | 426/656 |

*Primary Examiner*—Donald E. Czaja
*Assistant Examiner*—Evan Federman
*Attorney, Agent, or Firm*—Flynn, Thiel, Boutell & Tanis

[57] ABSTRACT

A stabilized oil and fat powder comprises one or both of gliadin and glutenin and a oil or fat. The oil and fat may have been partially or all totally clathrated and/or coated with gliadin and/or glutenin.

6 Claims, 1 Drawing Sheet

STABILIZED OIL AND FAT POWDER

This invention relates to stabilized oil or fat powders and processes for preparing the same.

PRIOR ART

In recent years, it has been known that oils or fats containing unsaturated fatty acids have physiological action, and these oils or fats have been widely used for addition to foods and livestock feeds. Taking into account the ease in handling upon addition to foods or feeds, these oils or fats generally are powdered. Conventionally, for the powdering of oils or fats, there is adopted a method in which oils or fats are emulsified by the use of casein, dextrin or another emulsifier, followed by the spray drying of the emulsion. However, oils or fats containing higher unsaturated fatty acids have a tendency to degrade or polymerize by the influence of heat, light, oxygen and the like. For instance, when refined fish oil containing large amounts of higher unsaturated fatty acids is powdered by the above known method, the powder deteriorates at a rate several hundreds time faster than the oil not powdered because of the increase in the surface area caused by the powdering. Thus, powdering is very difficult.

In order to obtain a stable oil or fat powder, there has been adopted a method wherein oils or fats are encapsulated in microcapsules in the form of a powder (microcapsule method) or a method wherein oils or fats are included with cyclodextrin and powdered (cyclodextrin method). However, the microcapsule method is complicated in preparation operations which results in poor productivity and high production costs, coupled with another problem that, during storage, the capsules may be broken and a limitation is placed on the type of capsule which is usable in foods or feeds. With the cyclodextrin method, the ratio of materials to be included (oils or fats) and cyclodextrin is so small that the resultant product has only a small content of vitamins. In addition, there are further disadvantages in that the solubility in water is small and the included oils or fats are released from the cyclodextrin ring by application of heat or by addition to a hydrous material. Moreover, it is substantially impossible to completely encapsulate an oil or fat in microcapsules or to permit an oil or fat to be included with cyclodextrin. The oil or fat not encapsulated in the microcapsules or not included with the cyclodextrin is left, which considerably impedes the stability of the powder.

SUMMARY OF THE INVENTION

Under these circumstances in the art, the present inventor made intensive studies and, as a result, found that when gluten or gliadin or glutenin contained in gluten and oils or fats are added to a solvent and agitated, after which the solvent is removed from the mixture and the resultant residue is subjected to powdering, a stable oil or fat powder can be obtained while suppressing the decomposition and polymerization of the oils or fats. The present invention is accomplished based on the above finding.

The invention provides a stabilized oil and fat powder which comprises one or both of gliadin and glutenin and an oil or fat.

It is preferable that the powder comprises 100 parts by weight of gliadin and/or glutenin per 1 to 51 parts by weight of oil or fat. In the invention, the oil or fat may be clathrated and/or coated with gliadin and/or glutenin.

The invention further provides a process for preparing a stabilized oil and fat powder composed of one or both of gliadin and glutenin and an oil or fat, which comprises the steps of adding gluten to a solvent to dissolve gluadin contained in the gluten into the solvent, adding an oil or fat to the solution, and then removing out the solvent from the solution to obtain the powder.

The powder of the invention may be prepared by adding glutenin and an oil or fat to a solvent and then removing out the solvent from the solution to obtain the powder.

The subject matter of the invention resides in:

(1) A stabilized oil or fat powder characterized by comprising at least one of gliadin and glutenin and an oil or fat.

(2) A stabilized oil or fat powder according to the above, characterized in that the oil or fat is included in the gliadin and/or glutenin.

(3) A stabilized oil or fat powder according to the, characterized in that at least a part of the oil or fat is covered with the gliadin and/or glutenin.

(4) A process for preparing a stabilized oil or fat powder characterized by the addition of an oil or fat to a solvent, dissolving gliadin therein, agitating the mixture, removing the solvent, and subjecting the resultant residue to powdering.

(5) A process for preparing a stabilized oil or fat powder characterized by the addition of gluten to a solvent under agitation to cause gliadin in the gluten to dissolve in the solvent, adding an oil or fat to the solution under agitation, removing the solvent, and subjecting the resultant residue to powdering.

(6) A process for preparing a stabilized oil or fat powder characterized by the addition of glutenin and an oil or fat to a solvent under agitation, removing the solvent, and subjecting the resultant residue to powdering.

(7) A process for preparing a stabilized oil or fat powder according to any of the above processes, characterized in that said solvent is a hydrous alcohol having a content of alcohol of 20 to 80% by volume.

The stabilized oil or fat powder of the invention consists of at least one of gliadin and glutenin and oils or fats. The gliadin and glutenin are considered to take oils or fats in a hydrophobic region of the molecule so as to prevent contact of the oils or fats with oxygen, thereby inhibiting degradation of the oils or fats. The oils or fats may be included or covered with gliadin and/or gluten, or may be ones which are a mixture of included and covered oils or fats. When covered, oils or fats may be only partially or wholly covered. Alternatively, oil or fat particles may be not only be covered with a uniform film but also covered on at least part of their surfaces with particles of gliadin and/or glutenin.

The ratio of gliadin and/or glutenin and an oil or fat in the oil or fat powder of the invention is preferably 1 to 51 parts by weight of the oil or fat per 100 parts by weight of gliadin and/or gluten.

The gliadin is a mixed protein mainly composed of glutamic acid and proline. A high molecular weight gliadin has a molecular weight of 100,000 to 12,500. When the SS bonds are cut, it is separated into polypeptides having a molecular weight of 44,000 to 36,000. On the other hand, glutenin is also a protein contains in gluten and has SS bonds between and in chains and is considered as an agglomerate of gigantic molecules having a molecular weight of several million. In the practice of the invention, gluten containing gliadin and glutenin can be used as it is. Gluten contains about 40% of each of gliadin and glutenin, about 20% of starch and others. When water is added to gluten, a very high viscoelasticity is exhibited by the resultant mixture, by which gluten is utilized as a thickener, binder or a water retaining agent for addition to foods. It is generally accepted that the viscosity results from gliadin and the elasticity results from glutenin.

The oil or fat powder of the invention is obtained by a method wherein gluten and oils or fats are added to a solvent and agitated for dissolution or dispersion, after which the solvent is removed and the resultant residue is subjected to powdering, or by a method wherein gliadin is extracted from gluten by the use of a solvent, after which insoluble matters are removed, and oils or fats are added to the resultant solution and agitated, followed by removing the solvent from the mixture, and subjecting the resultant residue to powdering, or by a method wherein glutenin and oils or fats are added to a solvent and agitated, after which the solvent is removed and the resultant residue is subjected to powdering.

Gluten is soluble in diluted acetic acid, ammonia, and a mixture of acetic acid and ethanol, and gliadin is soluble in a hydrous alcohol, diluted acids, diluted akaline solutions and the like. In this connection, however, when gliadin in gluten is allowed to dissolve in a solvent, a hydrous alcohol is favorably used because such an alcohol can suppress the swelling of glutenin with water and an increase of viscosity, thus leading to a high working efficiency. On the other hand, where glutenin is used, gliadin is first extracted from gluten with a solvent incapable of dissolving glutenin such as, for example, a hydrous alcohol, after which insoluble matters in the hydrous alcohol (mainly composed of glutenin along with starch) are separated and used. Glutenin is insoluble in a hydrous alcohol, but the hydrous alcohol may be used as a solvent. In this case, glutenin is used as a dispersion in the hydrous alcohol.

The gluten may be wet gluten separated from wheat flour or may be activated gluten which has been obtained after drying. In view of workability, activated gluten in the form of a dried powder is preferred.

The hydrous alcohol may be one which has a content of alcohol of 20 to 80% by volume, preferably from 65 to 75% by volume. The ratio of the hydrous alcohol and gluten is in the range of from 3 to 6 parts by weight, preferably from 4 to 5 parts by weight, of the hydrous alcohol per part by weight of gluten. The alcohol should preferably be monohydric alcohols such as methyl alcohol, ethyl alcohol, isopropyl alcohol and the like. When gluten is added to the hydrous alcohol and agitated, gliadin is extracted from gluten in the hydrous alcohol. The agitation is preferably effected by means of a high speed agitator for a time of not shorter than 30 minutes, by which substantially all gliadin in the gluten can be extracted in the hydrous alcohol.

After addition of oils or fats to a solvent in which is dissolved or dispersed gluten or gliadin or to a solvent to which glutenin is added, the mixture is agitated. This agitation is effected for a time of from 10 to 30 minutes or longer, preferably from 15 to 45 minutes by the use of an agitator such as, for example, a high speed homomixer. The amount of the oils or fats is preferably from 0.05 to 4 parts by weight per part by weight of gluten and from 0.1 to 4 parts by weight per part by weigh of gliadin and/or glutenin.

The oils or fats used in the practice of the invention may be various oils or fats such as animal oils or fats and plant oils or fats. Preferably, refined fish oils containing large amounts of higher unsaturated fatty acids, and oils or fats containing larger amounts of $\alpha$-linoleic acid or $\gamma$-linoleic acid are used. These oils or fats are unstable against oxygen, on which the present invention shows a satisfactory effect.

In the practice of the invention, antioxidants may be added to the solvent or oils or fats, if necessary. Moreover, synergists such as citric acid, EDTA and the like or other additives such as lecithin may be added, if necessary. The use of an antioxidant and a synergist in combination can further improve the resistance to oxidation. If necessary an emulsifier such as lecithin, glycerine fatty acid esters, sorbitan fatty acid esters, sugar fatty acid esters may be added to the solvent. The use of these emulsifiers can improve the mixing efficiency by agitation, by which an efficiency of contact between oils or fats and gliadin and/or glutenin is improved with a stabilized oil or fat powder being prepared efficiently.

In accordance with the method of the invention, after the addition of an oil or fat to a solvent and agitation, the solvent is removed and the residue is subjected to powdering. The powdering may be effected by spray drying, drying in vacuum, freeze-drying, drying in drum or other known drying methods.

When a diluted acid (e.g. an organic acid such as acetic acid, citric acid, malic acid or the like or a mineral acid such as hydrochloric acid, sulfuric acid, phosphoric acid or the like) is used as a solvent, the pH should preferably be adjusted to 3 to 4. On the contrary, when a diluted alkaline solution (such as ammonia, sodium carbonate, sodium hydrogencarbonate, phosphates or the like) is used, the pH should preferably adjusted to 9 to 11. Subsequently, oils or fats are added.

The oil or fat powder obtained according to the method of the invention is stable when allowed to stand in air or added to hydrous foods, and is unlikely to decompose or change in quality by polymerization because of oxygen, light or heat. In addition, the powder is advantageous in that when it is added to foods or feeds, the powder has the functions of thickening and binding foods and retaining water in the foods.

As will become apparent from the above, the oil or fat powder of the invention is very stable against oxygen, heat and light. Even when oils or fats containing higher unsaturated fatty acids, which are very unstable and deteriorate within a short time when powdered, are used for powdering, there is little possibility of changing the quality by decomposition or polymerization of the oils or fats. In addition, the content of oils or fats in the powder is very high, and thus the powder high has utility with high stability. When the oil or fat powder of the invention is added to foods, it exhibits not only the properties inherent to the oil or fat, but also other functions of imparting thickening, binding and water retention properties to the foods. According to the method having invention, the oil or fat powder of an good properties can be reliably prepared. Gluten is provided relatively inexpensively and gliadin or glutenin is readily available by separation from gluten, so that a highly stabilized oil or fat powder can be obtained inexpensively.

EXAMPLES

The present invention is described in more detail by way of examples.

EXAMPLE 1, COMPARATIVE EXAMPLE 1

1 kg of activated gluten powder was added to 5 liters of hydrous ethanol having a content of the alcohol of 70 vol %, followed by agitation for 30 minutes by the use of an agitator. Subsequently, 50 g of a refined, deodored fish oil (18% of eicosapentaenoic acid and 13% of docosahexaenoic acid with a peroxide value of 0.1) was added to 1 liter of the hydrous ethanol and agitated for 15 minutes, followed by removal of the hydrous ethanol by means of a vacuum dryer and division of the dried matter into fine pieces to obtain a powder (oil powder (1)).

On the other hand, the balance of the hydrous alcohol which had been agitated for 30 minutes after the addition of the activated gluten was centrifugally separated for 20 minutes at 3000 r.p.m. to remove the resultant precipitate (glutenin, starch and the like). Thereafter, the solution in which was dissolved the gliadin was concentrated to such an extent that the concentration of the gliadin in the hydrous alcohol was 20% (weight/volume percent), after which 45 g of such refined deodored fish oil as used above was added to 1 liter of the hydrous alcohol and agitated for 15 minutes by means of a homomixer, followed by drying by the use of a vacuum dryer and powdering to obtain a powder (oil powder-(2)).

In the same manner as the method of preparing the oil powder (1) using such as oil as used above but adding 0.1 wt % of BHA as an antioxidant and 0.3 wt % of a rosemary extract (Moluccas 10P, available from Asama Kasei K.K.), which is a natural antioxidant, there were obtained oil powders (3) and (4), respectively.

Figure 1:
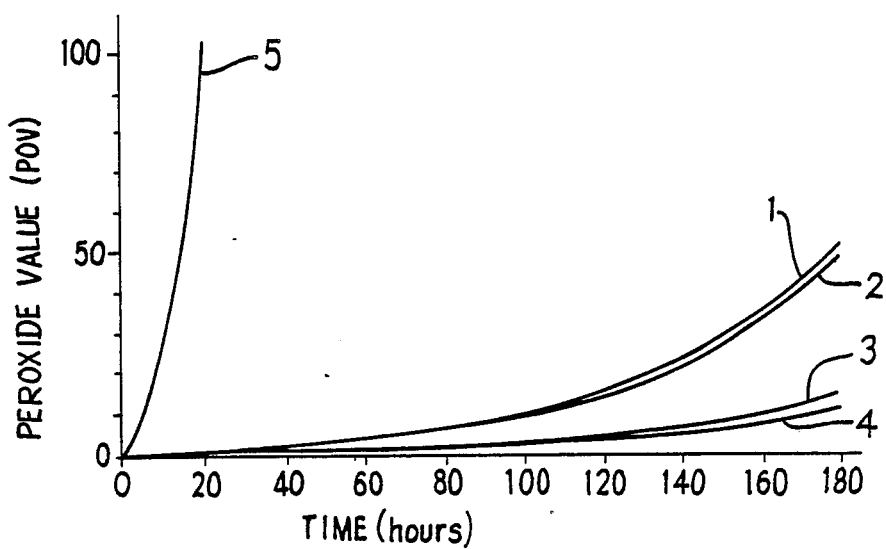
FIG. 1 is a graph showing the thermal stability of oil powders of Example 1 and Comparative Example 1.

These oil powders (1) to (4) and oil powder (5) which was obtained by subjecting an emulsion obtained by emulsifying a refined deodored fish oil as used above by the use of dextrin, sodium caseinate and an emulsifier, followed by dehydration and powdering (Comparative Example 1) were each heated in an oven at 50° C. in an open system to check the degree of deterioration of the oil with time as a timewise variation in increase of a peroxide value of the oil. The results are shown in FIG. 1. The results revealed that the oil powders obtained according to the method of the invention exhibit a very small increase in peroxide value when heated over a long term period of time as compared with the conventional oil powder obtained by mere emulsification and powdering and are thus significantly more stable than the known oil powder.

EXAMPLE 2, COMPARATIVE EXAMPLE 2

50 g of a refined beefsteak plant oil (containing 60% of α-linoleic acid with a peroxide value of 0.1) was added to 1 liter of gliadin-containing hydrous ethanol which was obtained by removing the hydrous ethanol-insoluble matters in the same manner as in Example 1 and had a gliadin concentration of 20% (w/v percent) and a dispersion of hydrous ethanol-insoluble matters (mainly composed of glutenin along with starch and hereinafter referred to simply as crude glutenin) added to hydrous ethanol at a concentration of 20 wt %. Subsequently, the respective mixtures were agitated under the same conditions as in Example 1, from which the solvent was removed by means of a spray dryer to obtain powders (oil powder (6) obtained by the use of the gliadin and oil powder (7) obtained by the use of the crude glutenin).

Figure 2:
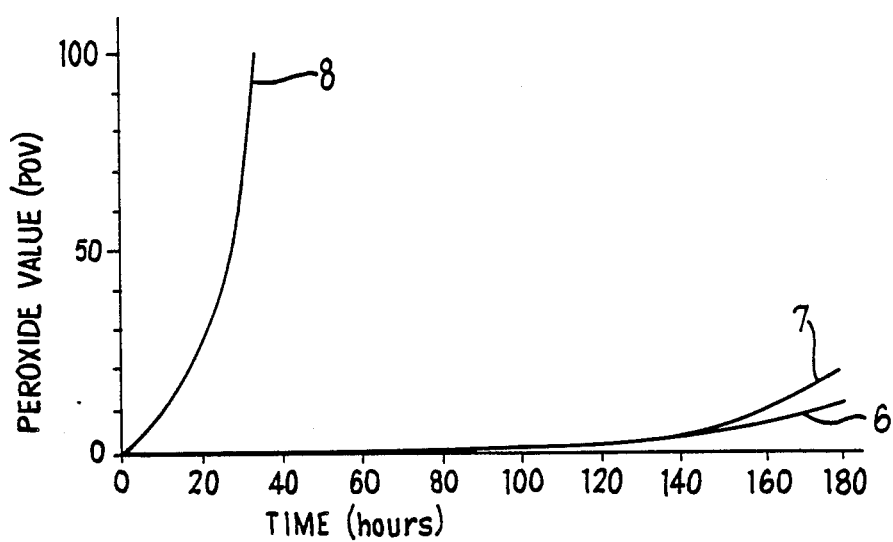
FIG. 2 is a graph showing the thermal stability of oil powders of Example 2 and Comparative Example 2.

The oil powders (6) and (7), and oil powder (8), which was obtained by spray drying an emulsion, with dextrin, sodium caseinate and an emulsifier, of a refined beefsteak plant as used for the oil powders (6) and (7) (Comparative Example 2) were each subjected to a deterioration-with-time test of the oil under the same conditions as in Example 1. The results are shown in FIG. 2. From the results, it was confirmed that the oil powders obtained according to the method of the invention were more stable than the known oil powder obtained by powdering after mere emulsification.

EXAMPLE 3 AND COMPARATIVE EXAMPLE 3

1 kg of wheat flour having a higher protein content than normal, 10 g of salt, 12 g of soda powder ($Na_2CO_3$ and $NaPO_4$) and 320 ml of water were added to 10 g of each of the two oil powders (1) and (5) obtained in Example 1 and used to make raw noodles by a usual manner. The above procedure was repeated without the use of any powdery oil to obtain raw noodles. The three raw noodles were each boiled for 3 minutes, after which the boiled noodles were placed in a soup and allowed to stand. The feel (pastiness, the presence or absence of firmness) upon eating of the noodles were checked with time. The results are shown in Table 1. It was confirmed that the noodles to which the oil powders of the invention were added were suppressed from pastiness when compared with the noodles made with the known oil powder.

The noodle-making properties were judged by comparison with those for noodles to which no oil powder was added. The degree of firmness of the noodles was determined by comparison with a standard degree of firmness 2 minutes after boiling.

TABLE 1

| Noodles Using Oil Powder (1) | Noodles Using Oil Powder (5) | Noodles Using Using No Oil Powder |
|---|---|---|
| Noodle-making Properties | | |
| good | fair | moderate |
| Feel After Boiling | | |
| after 2 min. firm | moderate | moderate |
| after 5 min. firm | starting to become pasty | starting to slightly become pasty |
| after 7 min. slight loss of firmness | becoming fully pasty | becoming fairly pasty |
| after 10 min. firmness | | becoming fully pasty |
| after 12 min. starting to become pasty | | |
| after 15 min. becoming fully pasty | | |

I claim:

1. A process for preparing a stabilized oil or fat powder containing gliadin and a member selected from the group consisting of an oil and a fat, which comprises the steps of: dissolving the gliadin in an aqueous alcohol comprising 20 to 80 volume percent alcohol to form a solution; mixing said member with said solution; removing said aqueous alcohol and obtaining said stabilized powder.

2. The process of claim 1, wherein the dissolved gliadin is obtained by adding gluten to the aqueous alcohol.

3. The stabilized powder obtained from the process of claim 1.

4. A stabilized powder obtained from the process of claim 2.

5. The process of claim 1, wherein said aqueous alcohol is selected from the group consisting of methyl alcohol, ethyl alcohol and isopropyl alcohol.

6. The process of claim 1, wherein said stabilized powder comprises 100 parts by weight of gliadin per 1–51 parts by weight of said member.

* * * * *